(12) United States Patent
Woo et al.

(10) Patent No.: US 9,218,062 B2
(45) Date of Patent: Dec. 22, 2015

(54) THREE-DIMENSIONAL MENU SYSTEM USING MANUAL OPERATION TOOLS

(75) Inventors: Woontack Woo, Buk-gu (KR); Hyeong Mook Lee, Buk-gu (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 327 days.

(21) Appl. No.: 13/575,571

(22) PCT Filed: Nov. 11, 2010

(86) PCT No.: PCT/KR2010/007962
§ 371 (c)(1),
(2), (4) Date: Jul. 26, 2012

(87) PCT Pub. No.: WO2011/093580
PCT Pub. Date: Aug. 4, 2011

(65) Prior Publication Data
US 2012/0304128 A1 Nov. 29, 2012

(30) Foreign Application Priority Data
Jan. 26, 2010 (KR) ........................ 10-2010-0006987

(51) Int. Cl.
G06F 3/01 (2006.01)
G06F 3/0346 (2013.01)
G06F 3/0362 (2013.01)

(52) U.S. Cl.
CPC .............. *G06F 3/017* (2013.01); *G06F 3/0346* (2013.01); *G06F 3/0362* (2013.01)

(58) Field of Classification Search
CPC .................. G06F 3/04815; G06F 2203/04802; G06F 3/0482; G06F 3/0481; G06F 3/04845
USPC .................................. 715/848, 852, 850, 836
See application file for complete search history.

(56) References Cited

U.S. PATENT DOCUMENTS

| | | | |
|---|---|---|---|
| 7,134,095 B1 * | 11/2006 | Smith et al. .................... | 715/860 |
| 7,693,702 B1 * | 4/2010 | Kerner et al. .................... | 703/22 |
| 7,917,868 B2 * | 3/2011 | Ok et al. ........................ | 715/848 |
| 8,120,605 B2 * | 2/2012 | Lee et al. ....................... | 345/419 |
| 8,488,246 B2 * | 7/2013 | Border et al. .................. | 359/630 |
| 8,542,907 B2 * | 9/2013 | Zalewski et al. ............... | 382/154 |
| 8,547,401 B2 * | 10/2013 | Mallinson et al. .............. | 345/633 |
| 8,611,600 B2 * | 12/2013 | Newman et al. ............... | 382/103 |
| 8,627,236 B2 * | 1/2014 | Jung et al. ...................... | 715/863 |
| 8,681,179 B2 * | 3/2014 | Rolleston et al. ............... | 345/633 |
| 8,731,332 B2 * | 5/2014 | Osako ............................. | 382/287 |
| 8,814,691 B2 * | 8/2014 | Haddick et al. ................. | 463/42 |
| 8,850,337 B2 * | 9/2014 | Ooi et al. ....................... | 715/762 |
| 8,872,762 B2 * | 10/2014 | Galor et al. .................... | 345/156 |
| 8,880,151 B1 * | 11/2014 | Stolka et al. ................... | 600/424 |

(Continued)

*Primary Examiner* — David Phantana Angkool
(74) *Attorney, Agent, or Firm* — Rothwell, Figg, Ernst & Manbeck, P.C.

(57) ABSTRACT

Disclosed is an augmented reality-based three-dimensional menu system using manual operation tools. According to the present invention, the three-dimensional menu system comprises: a display device; at least one pair of manual operation tools which are manually operated by the user, and are in a hexahedral shape; an image acquisition device which acquires images for the manual operation tools; and a menu augmentation unit which tracks the manual operation tools from the acquired images, and augments menu items in the vicinity of the manual operation tools of the acquired images, thereby outputting the augmented menu items to the display device.

11 Claims, 5 Drawing Sheets

(56) References Cited

U.S. PATENT DOCUMENTS 8,928,696 B1* 1/2015 Yang .............................. 345/659
2007/0199021 A1* 8/2007 Kim et al. ........................ 725/39
2008/0266323 A1* 10/2008 Biocca et al. .................. 345/633
2009/0187862 A1* 7/2009 DaCosta ........................ 715/836
2012/0304128 A1* 11/2012 Woo et al. ..................... 715/848

* cited by examiner

THREE-DIMENSIONAL MENU SYSTEM USING MANUAL OPERATION TOOLS

TECHNICAL FIELD

The present invention disclosed herein relates to a three-dimensional menu system, and more particularly, to a three-dimensional menu system based augmented reality using hexahedral manual operation tools.

BACKGROUND ART

Most application systems include menu systems for the user's convenience and effective manipulations. However, in the case of complicated systems providing many functions, it is difficult to construct menu systems having effective item classifications and access methods. For example, menu systems of conventional two-dimensional desk top application systems are constructed to provide menu browsing and selection functions using interfaces such as keyboards and mice. However, such menu browsing and selection functions are not suitable for three-dimensional systems due to, for example, spatial limitation.

Various studies have been conducted on three-dimensional menu systems to provide effective methods of manipulating systems in three-dimensional space. TULIP [D. A. Bowman, C. A. Wingrave, "Design and evaluation of menu systems for immersive virtual environments," IEEE virtual reality, Yokohama, Japan, 2001, p. 149-156.] provides a method of selecting a menu from a list of maximum sixteen menus in virtual environments by using a combination of fingers and thumbs wearing pinch gloves. Although the method is eidetic owing to interaction using fingers and thumbs, it is difficult to commercialize the method for end users because of expensive equipment. Butz [A. Butz, M. Gross, A. Kruger, "Tuister: a tangible UI for hierarchical structures", Proceedings of the ninth international conference on Intelligent User Interface, New York, USA, 2004, p. 223-225.] has introduced a hierarchical three-dimensional menu system "TUISTER" using an interface based on six OLED displays. The hierarchical three-dimensional menu system is advantageous in that menus can be eidetically manipulated through a rotational input tool such as a mouse wheel but is disadvantageous in terms of a limited number of displays and a one-dimensional input method. Poupyrev [I. Poupyrev, D. S. Tan, M. Billinghurst, H. Kato, H. Regenbrecht, N. Tetsutani, "Developing a generic augmented-reality interface", IEEE Computer, 2002, 35(3), p. 44-50] has proposed an augmented-reality menu system based on a marker supporting sensible interaction. However, since one marker corresponds to one function, it is difficult to apply the proposed system to complicated systems.

DISCLOSURE

Technical Problem

The present invention provides a three-dimensional menu system including hexahedral manual operation tools in which magnets and buttons are included for providing efficient three-dimensional hierarchical menu functions.

Technical Solution

In accordance with an exemplary embodiment of the present invention, a three-dimensional menu system includes: a display device; at least a pair of hexahedral manual operation tools configured to be manually manipulated by a user; an image acquisition device configured to acquire images from the manual operation tools; and a menu augmenting unit configured to track the manual operation tools using the acquired images, add menu items to the acquired images at positions around the manual operation tools, and output the images to the display device.

The menu augmenting unit may include: a tracking unit configured to track the manual operation tools in the acquired images; a menu organizing unit configured to organize menu items from previously stored menu information in response to manipulation of the manual operation tools; and a rendering unit configured to add the organized menu items to the acquired images at positions around the manual operation tools and output the images to the display device.

The rendering unit may add the organized menu items around the manual operation tools at regular intervals according to the number of the organized menu items.

A marker may be provided on each surface of the hexahedral manual operation tools, and the tracking unit may track the marker in the acquired images so as to track the manual operation tools.

The hexahedral manual operation tools may include central magnets at centers of surfaces thereof, respectively.

Auxiliary magnets may be arranged on each surface of the hexahedral manual operation tools around the center magnet at angular intervals.

The manual operation tools may include at least two hall sensors between two neighboring auxiliary magnets of the auxiliary magnets.

A hall sensor detecting unit may be disposed in the manual operation tools to detect outputs of the hall sensors.

The three-dimensional menu system may further include a rotation detecting unit, wherein when one of the manual operation tools is rotated in a state where the manual operation tools are in contact with each other, the rotation detecting unit may detect a rotation direction of the rotated manual operation tool based on an order of outputs of the hall sensors.

The manual operation tools may include a manipulation button on at least one corner thereof and a manipulation button control unit therein, and the menu augmenting unit may include a manual operation tool input unit configured to receive a manipulation signal from the manipulation button control unit.

In accordance with another exemplary embodiment of the present invention, there are provided manual operation tools manually operable for use with a three-dimensional menu system in which images of the manual operation tools are acquired so as to track the manual operation tools in the acquired images, add menu items to the acquired images around the manual operation tools, and output the images to a displace device, the manual operation tools being characterized in that: the manual operation tools have a hexahedral shape and constitute at least one pair; and the manual operation tools includes a marker on each surface thereof and a central magnet at a center of each surface thereof.

Auxiliary magnets may be arranged on each surface of the hexahedral manual operation tools around the center magnet at regular intervals.

The manual operation tools may include at least two hall sensors between two neighboring auxiliary magnets of the auxiliary magnets.

A hall sensor detecting unit may be disposed in the manual operation tools to detect outputs of the hall sensors.

The manual operation tools may further include a rotation detecting unit, wherein when one of the manual operation tools is rotated in a state where the manual operation tools are in contact with each other, the rotation detecting unit may detect a rotation direction of the rotated manual operation tool based on an order of outputs of the hall sensors.

The manual operation tools may further include: a manipulation button on at least one corner thereof; and a manipulation button control unit therein to transmit a manipulation signal of the manipulation button.

Advantageous Effects

According to the present invention, three-dimensional menus can be effectively controlled using a pair of hexahedral manual operation tools.

BEST MODE

Figure 1:
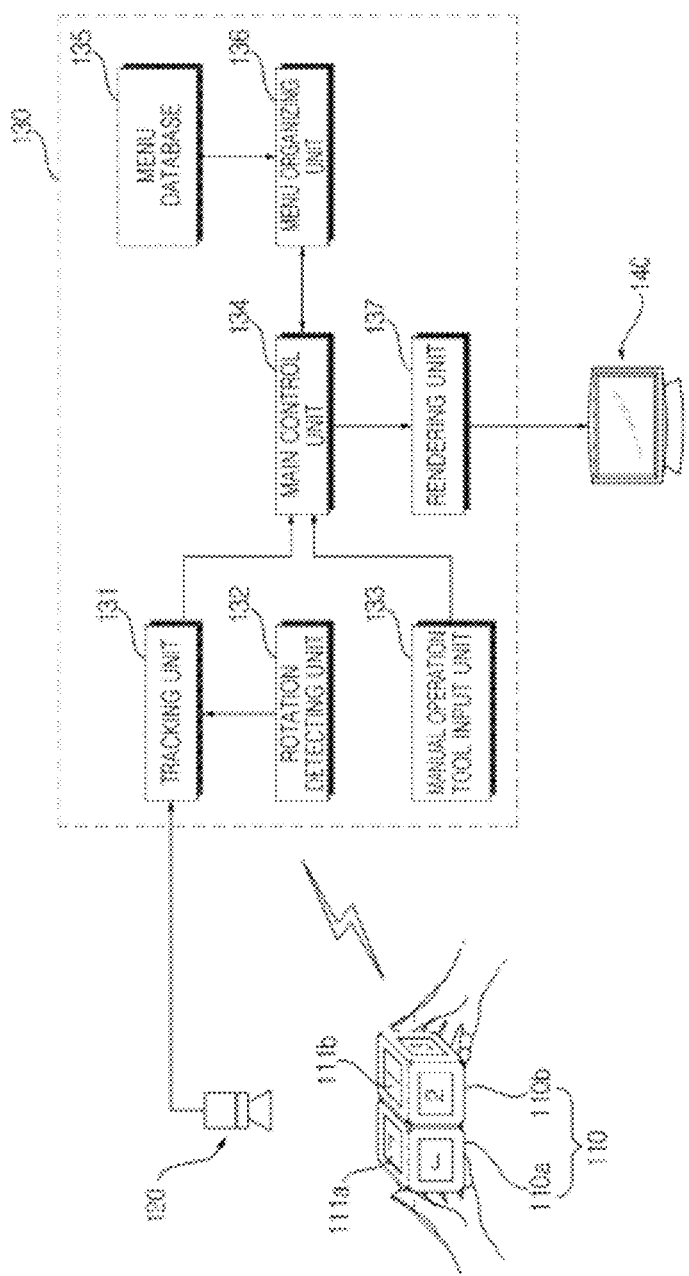
FIG. 1 is a view illustrating a three-dimensional menu system according to an embodiment of the present invention.

Exemplary embodiments of the present invention will be described below in more detail with reference to the accompanying drawings. In the following description and attached drawings, like elements are denoted by like reference numerals, and descriptions thereof are not repeated. In the following description, well-known functions or constructions are not described in detail since they would obscure the invention in unnecessary detail.

FIG. 1 is a view illustrating a three-dimensional menu system according to an embodiment of the present invention.

The three-dimensional menu system of the current embodiment includes: manual operation tools 110 which a user can manipulate to browse and select menus hierarchically; an image acquisition device 120 configured to take images of the manual operation tools 110; a menu augmenting unit 130 configured to track the manual operation tools 110 in the images taken by the image acquisition device 120 and add predetermined menu items to the images in a three-dimensional ring shape around the manual operation tool 110; and a display device 140 configured to display images of three-dimensional menus received from the menu augmenting unit 130.

The image acquisition device 120 may be a digital or analog video camera.

The manual operation tools 110 may include a pair of manual operation tools 110a and 110b so that a user can manipulate with his both hands, respectively. The manual operation tools 110 may have a regular hexahedral shape for the convenience of manipulation, and markers 111a and 111b may be provided on the sides of the manual operation tools 110 for tracking the position and direction of the manual operation tools 110 using the markers 111a and 111b. The manual operation tools 110 will be described later in more detail.

The menu augmenting unit 130 may include: a tracking unit 131; a rotation detecting unit 132; a manual operation tool input unit 133; a main control unit 134; a menu database 135; a menu organizing unit 136; and a rendering unit 137.

The tracking unit 131 detects and tracks the markers 111a and 111b from images captured by the image acquisition device 120 so as to track the position and direction of the manual operation tools 110. For example, the manual operation tools 110 may be tracked by a multi-marker tracking method disclosed in [Ha, T., and Woo, W., Graphical Tangible User Interface for a AR Authoring Tool in Product Design Environment, ISUVR 2007].

If a user rotates at least one of the manual operation tools 110a and 110b, the rotation detecting unit 132 detects the rotation direction and amount of the at least one of the manual operation tools 110a and 110b and transmits the detected result to the tracking unit 131. The rotation detecting unit 132 will be described later in more detail when the manual operation tools 110 are described in detail.

The manual operation tool input unit 133 receives a manipulation signal generating when a manipulation button (described later) of the manual operation tools 110a and 110b is pressed. Signals may be transmitted between the manual operation tool input unit 133 and the manual operation tools 110 by a wireless communication method such as Bluetooth and Zigbee.

The menu database 135 stores hierarchical menu information. The hierarchical menu information includes menu items and submenu items subordinate to the menu items. The menu items and the submenu items have a hierarchical structure. Such hierarchical menu information may be stored in a tree structure.

The menu organizing unit 136 organizes menu items using the hierarchical menu information stored in the menu database 135 according to a manipulation signal received through the manual operation tool input unit 133. For example, if a user selects a particular menu item using a manipulation button of the manual operation tools 110, the menu organizing unit 136 reads corresponding submenu items from the menu database 135 and adds the submenu items to a menu structure, and if a user closes submenu items subordinate to a particular menu item by using a manipulation button of the manual operation tool 110, the menu organizing unit 136 deletes the submenu items from the menu structure.

The main control unit 134 controls elements of the tracking unit 131, the manual operation tool input unit 133, the menu organizing unit 136, the rendering unit 137, and the menu augmenting unit 130, and also controls interactions among the elements.

Based on the position and direction of the manual operation tools 110 tracked by the tracking unit 131, the rendering unit 137 adds organized menu items to images captured by the image acquisition device 120 at positions around the manual operation tool 110 and outputs the images to the display device 140.

For example, the rendering unit 137 may add menu items to regularly arranged positions around the manual operation tool 110 in a ring shape according to the number of the menu items (having the same hierarchical level) selected from organized menu items.

Figure 2:
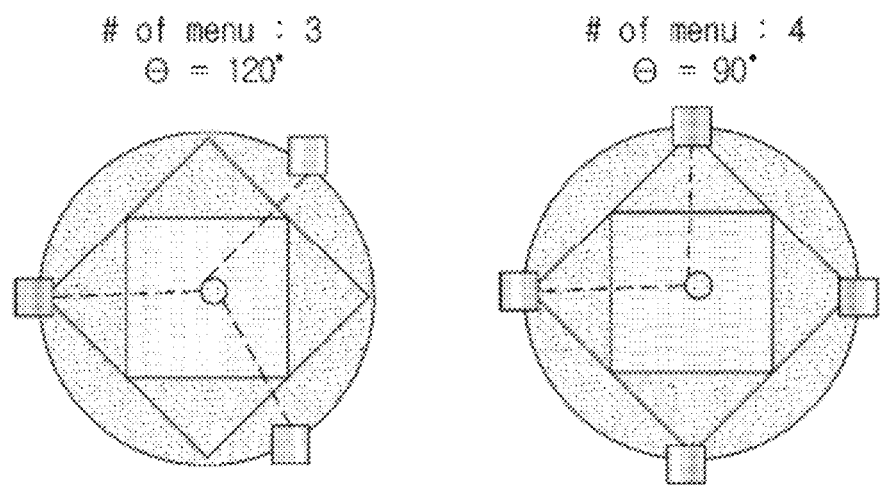
FIG. 2 is a view for explaining a method for determining menu positions around a manual operation tool 110 according to the number of menu items to be added.

FIG. 2 is a view for explaining a method for determining menu positions around a manual operation tool 110 according to the number of menu items to be added. Referring to FIG. 2, menu items are added to positions on an circle having a predetermined radius and surrounding the manual operation tool 110 in a manner such that the positions are spaced at intervals of θ=(360°/the number of the menu items).

The display device 140 displays images of three-dimensional menus received from the rendering unit 137 (the menu augmenting unit 130) so that a user can see the three-dimensional menus. The display device 140 may be a general monitor device or a head mounted display (HMD) device that can be put on like glasses.

Hereinafter, the manual operation tools 110 will be described in more detail.

Figure 3:
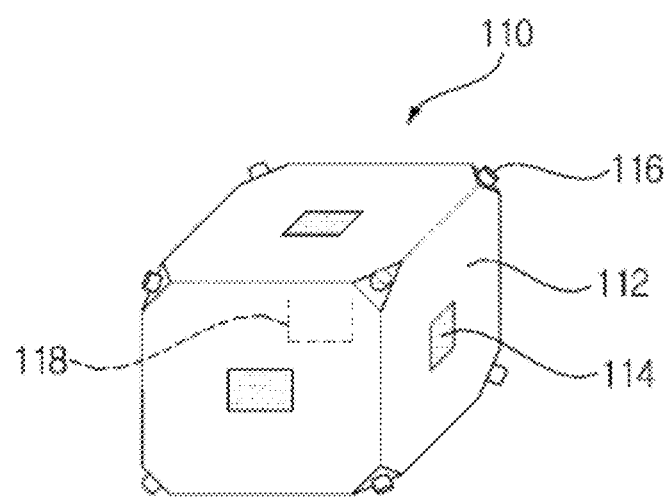
FIG. 3 is a perspective view illustrating a manual operation tool according to an embodiment of the present invention.
Figure 4:
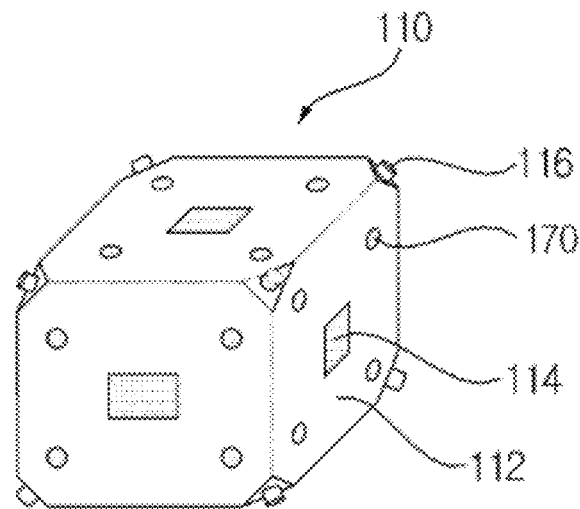
FIG. 4 is a perspective view illustrating a manual operation tool according to another embodiment of the present invention.
Figure 5:
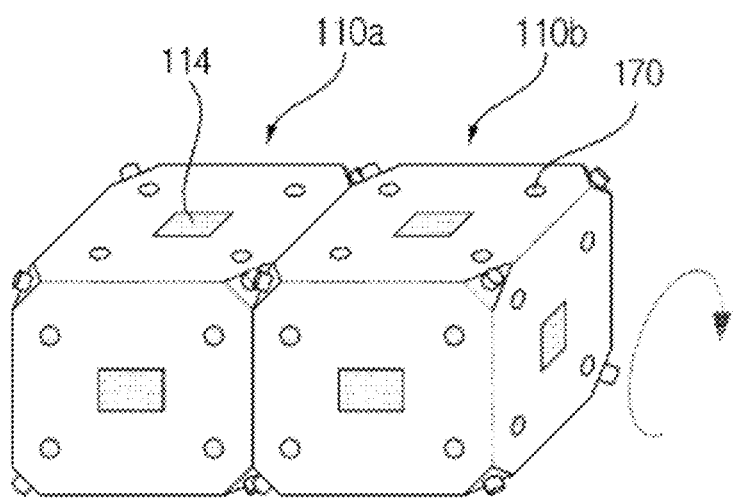
FIG. 5 is a view for explaining how manual operation tools are coupled in pairs and are manipulated.

FIG. 3 is a perspective view illustrating a manual operation tool according to an embodiment of the present invention, FIG. 4 is a perspective view illustrating a manual operation tool according to another embodiment of the present invention, and FIG. 5 is a view for explaining how manual operation tools are coupled in pairs and are manipulated.

Referring to FIG. 3, a manual operation tool 110 has a hexahedral shape as described above, and central magnets 114 are disposed on surfaces 112 of the manual operation tool 110, respectively. A manipulation button 116 is provided on at least one corner of the hexahedral manual operation tool 110, and a manipulation button control unit 118 is disposed in the manual operation tool 110 to receive a manipulation signal generated by the manipulation button 116 and transmit the manipulation signal to the manual operation tool input unit 133 of the menu augmenting unit 130.

Manual operation tools 110 may be coupled in pairs, and a user may browse menus hierarchically using the manual operation tools 110, respectively. The manual operation tools 110 may be exactly engaged with each other, and a user may feel a coupling force when manipulate the manual operation tools 110. The central magnets 114 of the manual operation tools 110 exerts a coupling force between the manual operation tools 110 (110a and 110b) so that a user can feel the coupling force, and brings the manual operation tools 110 into contact with each other at exact positions.

Referring to FIG. 4, according to another embodiment of the present invention, auxiliary magnets 170 are disposed at intervals of regular angles around a central magnet 114 provided on each surface of a manual operation tool 110. If one of a pair of manual operation tools 110a and 110b is rotated in a state where the manual operation tools 110a and 110b are coupled to each other as shown in FIG. 5, auxiliary magnets 170 of the respective manual operation tools 110a and 110b are aligned with and brought into contact with each other at every predetermined angles while the one of the manual operation tools 110a and 110b is rotated, and thus a user can easily perceive the amount of rotation. In the embodiment shown in FIG. 4, the auxiliary magnets 170 are arranged around the central magnet 114 at intervals of 90 degrees. However, the auxiliary magnets 170 may be arranged around the central magnet 114 at intervals of different angles (for example, 60 or 45 degrees).

Figure 6:
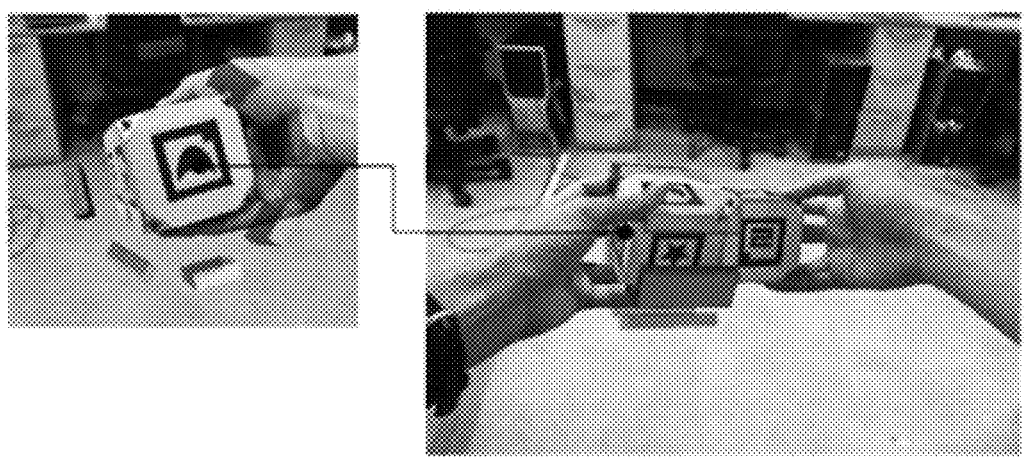
FIG. 6 shows images in which eight menu items are added in a ring shape to manual operation tools.

An explanation will now be given of an exemplary method for hierarchically browsing and selecting menus using the pair of manual operation tools 110. If first hierarchical menu items are added in a ring shape to positions around the manual operation tool 110a put on the left hand of a user, the user can select a desired menu item while rotating the manual operation tool 110a, and if the user presses a predetermined button of the manual operation tool 110a, second hierarchical menu items subordinate to the selected menu item may be added to the manual operation tool 110b put on the right hand of the user. Then, the user can select a desired second hierarchical menu item while rotating the manual operation tool 110b, and may press a predetermined button of the manual operation tool 110b to move the second hierarchical menu items from the unloading chambers 110b to the manual operation tool 110a and simultaneously add third hierarchical menu items subordinate to the selected second hierarchical menu item to the manual operation tool 110b. FIG. 6 shows images in which eight menu items are added in a ring shape to positions around manual operation tools.

As described above, the tracking unit 131 is used to detect the markers 111a and 111b so as to track the position and direction of the manual operation tools 110. However, the markers 111a and 111b may be hidden by a user while the manual operation tools 110 are rotated, or the rotation direction of the manual operation tools 110 may be incorrectly detected or may not be detected due to blurs caused by a high rotation speed. In this case, tracking may be improperly carried out or fail. Therefore, if the tracking unit 131 receives information about the rotation direction and amount of the manual operation tools 110 from the rotation detecting unit 132, the tracking unit 131 tracks the manual operation tools 110 based on the received information.

According to another embodiment, so as to detect the rotation direction and amount of a manual operation tool 110, at least two hall sensors may be disposed between two neighboring auxiliary magnets of the manual operation tool 110, and movement of auxiliary magnets of the other manual operation tool 110 may be detected using the hall sensors to get information about the rotation direction and amount of the other manual operation tool 110. A hall sensor is a device such as a transistor that varies in output voltage (current) according to the strength of a magnetic field.

Figure 7:
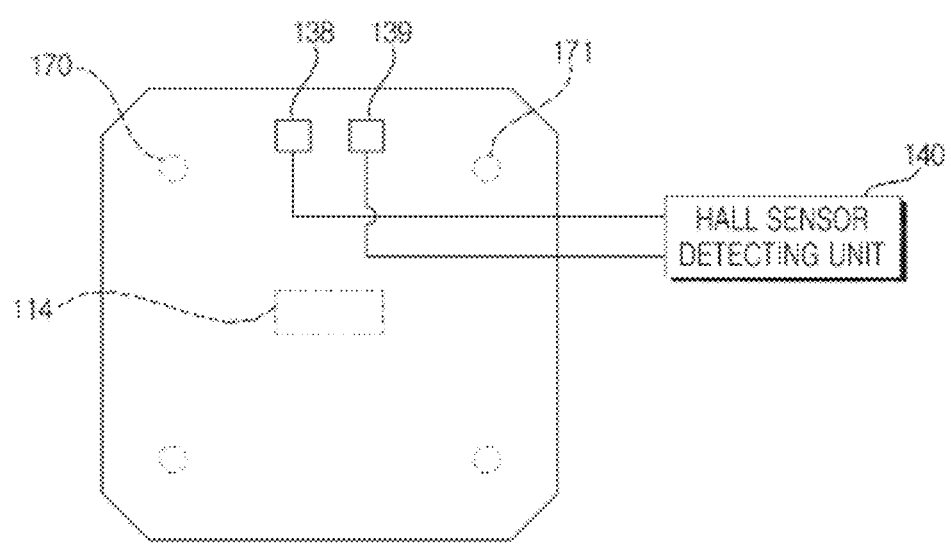
FIG. 7 is a view illustrating the inner surface of a side of a hexahedral manual operation tool 110 according to another embodiment of the present invention.

FIG. 7 is a view illustrating the inner surface of a side of such a hexahedral manual operation tool 110 according to another embodiment of the present invention. Referring to FIG. 7, two hall sensors 138 and 139 are disposed between two auxiliary magnets 170 and 171 on an inner surface of a side of the manual operation tool 110. In addition, a hall sensor detecting unit 140 is disposed in the manual operation tool 110 to detect outputs of the two hall sensors 138 and 139. If auxiliary magnets provided on a surface of another manual operation tool 110 pass by the hall sensors 138 and 139, the hall sensors 138 and 139 generate outputs sequentially according to the moving direction of the auxiliary magnets. The hall sensor detecting unit 140 detects the outputs of the hall sensors 138 and 139.

Figure 8:
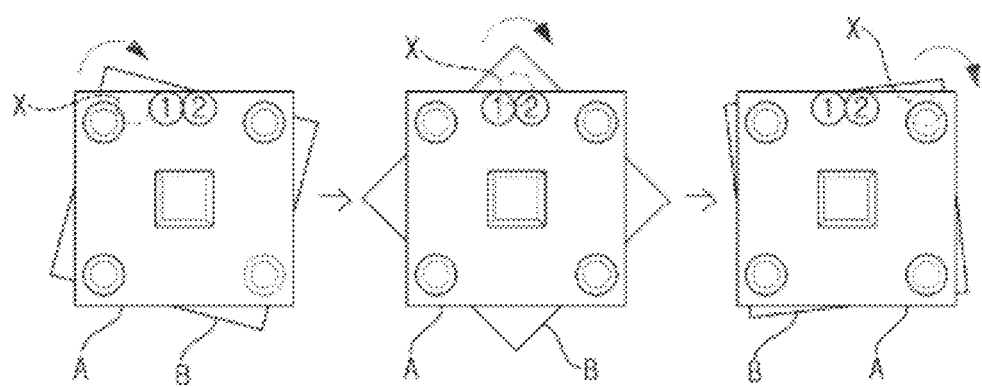
FIG. 8 is a view for explaining how outputs are generated from hall sensors according to the rotation direction of a manual operation tool when one of two neighboring manual operation tools is rotated.

FIG. 8 is a view for explaining how outputs are generated from the hall sensors 138 and 139 according to the rotation directions of two neighboring manual operation tools 110 when one of the two neighboring manual operation tools 110 is rotated. Referring to FIG. 8, if a manual operation tool (B) is rotated clockwise with respect to a manual operation tool (A) (or the manual operation tool (A) is rotated counterclockwise with respect to the manual operation tool (B), a hall sensor ① generates an output and then a hall sensor ② generates an output as an auxiliary magnet (X) of the manual operation tool (B) passes by. If the hall sensor ② generates an output and then the hall sensor ① generates an output, it can be considered as a reverse rotation. As described above, the direction of rotation can be detected using two hall sensors, and the amount of rotation may be detected as about 45° or more. The amount of rotation can be detected more precisely by using more hall sensors, and the number and positions of hall sensors may be properly determined as the number of auxiliary magnets increases.

As described above, at least two hall sensors may be disposed between two auxiliary magnets so as to surely detect rotation of the manual operation tools, and if the use of the hall sensors is combined with marker tracking, the manual operation tools may be tracked more rapidly and precisely.

Information about outputs of the hall sensors 138 and 139 detected by the hall sensor detecting unit 140 is transmitted to the rotation detecting unit 132 of the menu augmenting unit 130 by a wireless communication method, and the rotation detecting unit 132 can detect the rotation direction and amount of the manual operation tools 110a and 110b. In the embodiment, the rotation detecting unit 132 is included in the menu augmenting unit 130. However, the rotation detecting unit 132 may be included in the manual operation tools 110, and information about the rotation direction and amount of the manual operation tool 110 may be transmitted to the menu augmenting unit 130 by a wireless communication method.

The embodiments of the present invention may be written as computer programs and be implemented in general-use digital computers that execute the programs using a computer readable recording medium. Examples of the computer readable recording medium include magnetic storage media (e.g., ROMs, floppy disks, hard disks, etc.), optical recording media (e.g., CD-ROMs, or DVDs), and storage media such as carrier waves (e.g., transmission through the Internet).

Until now, preferred embodiments of the present invention are described mainly. It will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A three-dimensional menu system comprising:
   a display device;
   at least a pair of hexahedral manual operation tools configured to be manually manipulated by a user;
   an image acquisition device configured to acquire images of the manual operation tools; and
   a menu augmenting unit configured to track the manual operation tools using the acquired images, add menu items to the acquired images at positions around the manual operation tools, and output the images to the display device,
   wherein the menu augmenting unit comprising:
      a tracking unit configured to track the manual operation tools in the acquired images;
      a menu organizing unit configured to organize menu items from previously stored menu information in response to manipulation of the manual operation tools; and
      a rendering unit configured to add the organized menu items to the acquired images at positions around the manual operation tools and output the images to the display device.

2. The three-dimensional menu system of claim 1, wherein the rendering unit adds the organized menu items around the manual operation tools at regular intervals according to the number of the organized menu items.

3. The three-dimensional menu system of claim 1, wherein a marker is provided on each surface of the hexahedral manual operation tools, and the tracking unit tracks the marker in the acquired images so as to track the manual operation tools.

4. The three-dimensional menu system of claim 1, wherein the hexahedral manual operation tools comprise central magnets at centers of surfaces thereof, respectively.

5. The three-dimensional menu system of claim 4, wherein auxiliary magnets are arranged on each surface of the hexahedral manual operation tools around the center magnet at angular intervals.

6. The three-dimensional menu system of claim 5, wherein the manual operation tools comprise at least two hall sensors between two neighboring auxiliary magnets of the auxiliary magnets.

7. The three-dimensional menu system of claim 6, wherein a hall sensor detecting unit is disposed in the manual operation tools to detect outputs of the hall sensors.

8. The three-dimensional menu system of claim 6, further comprising a rotation detecting unit, wherein when one of the manual operation tools is rotated in a state where the manual operation tools are in contact with each other, the rotation detecting unit detects a rotation direction of the rotated manual operation tool based on an order of outputs of the hall sensors.

9. The three-dimensional menu system of claim 3, wherein the manual operation tools comprise a manipulation button on at least one corner thereof and a manipulation button control unit therein, and the menu augmenting unit comprises a manual operation tool input unit configured to receive a manipulation signal from the manipulation button control unit.

10. Manual operation tools manually operable for use with a three-dimensional menu system in which images of the manual operation tools are acquired so as to track the manual operation tools in the acquired images, add menu items to the acquired images around the manual operation tools, and output the images to a displace device, the manual operation tools being characterized in that: the manual operation tools have a hexahedral shape and constitute at least one pair; and the manual operation tools comprises a marker on each surface thereof, a central magnet at a center of each surface thereof, a rotation detecting unit and at least two hall sensors between two neighboring auxiliary magnets of the auxiliary magnets,
   wherein auxiliary magnets are arranged on each surface of the hexahedral manual operation tools around the center magnet at regular intervals,
   wherein a hall sensor detecting unit is disposed in the manual operation tools to detect outputs of the hall sensors, and
   wherein when one of the manual operation tools is rotated in a state where the manual operation tools are in contact with each other, the rotation detecting unit detects a rotation direction of the rotated manual operation tool based on an order of outputs of the hall sensors.

11. The manual operation tools of claim 10, further comprising: a manipulation button on at least one corner thereof; and a manipulation button control unit therein to transmit a manipulation signal of the manipulation button.

* * * * *